US009414081B1

(12) United States Patent
Fiumano et al.

(10) Patent No.: US 9,414,081 B1
(45) Date of Patent: Aug. 9, 2016

(54) ADAPTATION OF DIGITAL IMAGE TRANSCODING BASED ON ESTIMATED MEAN OPINION SCORES OF DIGITAL IMAGES

(71) Applicant: Sprint Communications Company L.P., Overland Park, KS (US)

(72) Inventors: Michael F. Fiumano, McLean, VA (US); Seng C. Gan, Ashburn, VA (US); Aaron Hinkle, Centreville, VA (US); Badri P. Subramanyan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 84 days.

(21) Appl. No.: 14/532,962

(22) Filed: Nov. 4, 2014

(51) Int. Cl.
*H04N 19/40* (2014.01)
*H04N 19/85* (2014.01)
*G06T 9/00* (2006.01)

(52) U.S. Cl.
CPC *H04N 19/40* (2014.11); *G06T 9/00* (2013.01); *H04N 19/85* (2014.11)

(58) Field of Classification Search
USPC .......................................... 382/232–233, 235
See application file for complete search history.

(56) References Cited

U.S. PATENT DOCUMENTS

| 6,563,517 | B1* | 5/2003 | Bhagwat | G06F 17/30905 375/E7.016 |
|---|---|---|---|---|
| 7,483,487 | B2* | 1/2009 | Liu | H04L 29/06027 375/240.11 |
| 8,300,961 | B2* | 10/2012 | Coulombe | H04N 19/40 382/232 |
| 8,355,567 | B2* | 1/2013 | Ferguson | H04N 9/73 382/162 |
| 8,520,075 | B2* | 8/2013 | Bhagavathy | H04N 17/004 348/180 |
| 8,587,630 | B1* | 11/2013 | Krinsky | H04N 7/14 348/14.01 |
| 8,824,783 | B2* | 9/2014 | Xu | G06T 7/0002 382/155 |

* cited by examiner

*Primary Examiner* — Ishrat I Sherali

(57) ABSTRACT

A method of transcoding web images. The method comprises determining a mean opinion score (MoS) for a test source digital image, transcoding the test source digital image to a test derived digital image, and determining a MoS for the test derived digital image presented on a standard display. The method further comprises receiving a source digital image by a server computer, where the source digital image is requested by a device for presentation on a target display, transcoding the source digital image to a derived digital image by a transcoding application executed by the server computer, determining an estimated MoS for the derived digital image based on the MoS for the test source digital image, based on the MoS for the test derived digital image, and based on differences between the standard display and the target display, and changing a parameter of the transcoding application based on the estimated MoS.

20 Claims, 11 Drawing Sheets

US 9,414,081 B1

ADAPTATION OF DIGITAL IMAGE TRANSCODING BASED ON ESTIMATED MEAN OPINION SCORES OF DIGITAL IMAGES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication may provide a variety of communication services to users comprising voice call service, text messaging service (SMS), multimedia message service (MMS), web browsing service, email service, and others. Mobile communication may be conducted on a variety of mobile communication devices such as mobile phones, personal digital assistants (PDAs), media players, wearable computers, headset computers, laptop computers, notebook computers, and tablet computers. Within each device category, typically a large variety of different models are commercially available, providing a variety of different performance characteristics. For example, displays of different mobile phone models may differ in size, number of pixels, brightness, contrast, and other characteristics.

Users of mobile communication devices may access a wide variety of content from web sites, for example text content, graphical image content, and video content. The content may vary in format. Graphical images may be stored as digital images in electronic files that have different sizes or numbers of bytes. The images may comprise different numbers of pixels. Each pixel may be encoded with more or fewer bits, corresponding to more or fewer colors or color gradations. The images may be encoded according to different digital image file formats.

SUMMARY

In an embodiment, a method of transcoding web images is disclosed. The method comprises determining a mean opinion score for a test source digital image, transcoding the test source digital image to a test derived digital image, presenting the test derived digital image on a standard display, and determining a mean opinion score for the test derived digital image presented on the standard display. The method further comprises receiving a source digital image by a server computer, where the source digital image is requested by a device for presentation on a target display and transcoding the source digital image to a derived digital image by the server computer executing a transcoding application. The method further comprises determining an estimated mean opinion score for the derived digital image by a scoring application based on the mean opinion score for the test source digital image, based on the mean opinion score for the test derived digital image presented on the standard display, and based on differences between the standard display and the target display. The method further comprises changing a parameter of the transcoding application based on the estimated mean opinion score.

In an embodiment, a method of compressing web images is disclosed. The method comprises presenting a test source digital image on a standard display, wherein the standard display is a display of a first model of mobile communication device, determining a mean opinion score for the test source digital image presented on the standard display, compressing the test source digital image to a test derived digital image, presenting the test derived digital image on the standard display, and determining a mean opinion score for the test derived digital image presented on the standard display. The method further comprises receiving a source digital image by a server computer, wherein the source digital image is requested by a mobile communication device for presentation on a target display of the mobile communication device and determining an estimated mean opinion score for the source digital image by a scoring application based on at least one of the number of bytes of the source digital image, the number of pixels of the source digital image, the file format of the source digital image, and an identity of a content server from which the source digital image is received. The method further comprises compressing the source digital image to a derived digital image by the server computer executing a compression application and determining an estimated mean opinion score for the derived digital image by the scoring application based on the mean opinion score for the test source digital image, based on the estimated mean opinion score for the source digital image, based on the mean opinion score for the test derived digital image, and based on differences between the standard display and the target display. The method further comprises changing a parameter of the compression application based on the estimated mean opinion score for the derived digital image.

In an embodiment, another method of compressing web images is disclosed. The method comprises determining a mean opinion score for a test source digital image, compressing the test source digital image to a test derived digital image, presenting the test derived digital image on a standard display, wherein the standard display is a display of a mobile communication device, and determining a mean opinion score for the test derived digital image presented on the standard display. The method further comprises receiving a source digital image by a server computer, wherein the source digital image is requested by a mobile communication device for presentation on a target display of the mobile communication device and determining an estimated mean opinion score for the source digital image by a scoring application based on at least one of the number of bytes of the source digital image, the number of pixels of the source digital image, the file format of the source digital image, and an identity of a content server from which the source digital image is received. The method further comprises compressing the source digital image to a derived digital image by the server computer executing a compression application and determining an estimated mean opinion score for the derived digital image by the scoring application based on the mean opinion score for the test source digital image, based on the estimated mean opinion score for the source digital image, based on the mean opinion score for the test derived digital image presented on the standard display, and based on differences between the standard display and the target display. The method further comprises changing a parameter of the compression application based on the estimated mean opinion score, compressing the source digital image to a second derived digital image by the server computer executing the compression application configured with the changed parameter, and sending the second derived digital image by the server computer to the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
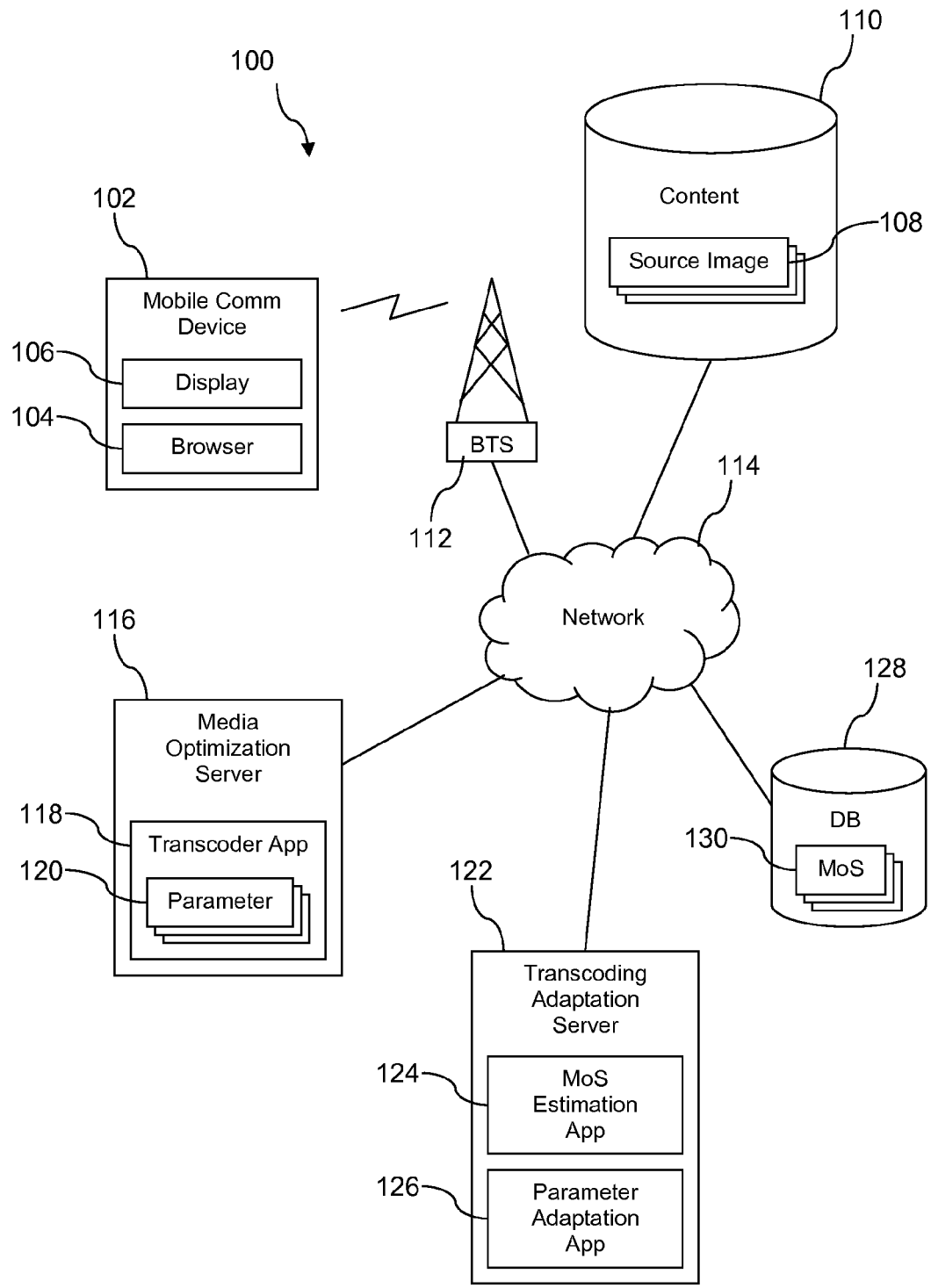
FIG. 1A and FIG. 1B are block diagrams of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method of adapting digital image transcoding, for example transcoding of web images, based on estimated mean opinion scores (MoS). The ability of mobile phones to browse the Internet, to access content, and to present rich content on a display of the mobile phone is a relatively recent technical development. Initially users were satisfied to be able to access text content from the Internet in any fashion. As mobile phone capabilities have increased and portable displays have improved, users have come to expect more. It isn't enough to present any graphical image on the mobile phone display: now the user may expect the graphical images presented on their mobile phones to be sharply resolved and vividly colored.

To conserve limited wireless communication resources (e.g., wireless spectrum), digital images requested by mobile communication devices from a web site are typically processed with lossy compression algorithms in the mobile communication network before transmitting over-the-air to the mobile device. In some cases, the user may be dissatisfied by the presentation of the resultant compressed digital image file on his or her mobile device. The system and method taught herein may avoid or reduce such user dissatisfaction.

In a simple example of adapting digital image transcoding, a panel of users score the quality of a test source digital image presented on a standard display and then score the quality of a test derived digital image presented on the same standard display, where the test derived digital image is created by transcoding the test source digital image with a standard transcoding algorithm. The scoring may be referred to as a mean opinion score (MoS). A minimum acceptable digital image quality may be defined as a specific MoS score. For example, if the MoS ranges from 1 to 5, the minimum acceptable MoS may be 3.

At a later point in time, a user of a mobile communication device having a display that is different from the standard display may request a digital image (e.g., a web image requested from a web content data store) that may be referred to as a source digital image. This source digital image may be transcoded, for example using a lossy compression algorithm, to create a derived digital image. The system taught herein may calculate an estimated MoS for the source digital image and an estimated MoS for the derived digital image. If the estimated MoS for the derived digital image is less than the minimum acceptable MoS, the system may change a parameter of the transcoding algorithm, thereby adapting future transcoding of digital images using the transcoding algorithm to achieve an improved estimated MoS. For example, the change of the parameter may result in less aggressive compression being performed on the source digital image going forwards.

An estimated MoS may be determined by one or more of comparing the test source digital image to the source digital image, comparing the test derived digital image to the derived digital image, comparing the standard transcoding algorithm to the transcoding algorithm, and comparing the characteristics of the user mobile display to the characteristics of the standard display. In an embodiment, a plurality of different standard scenarios may be scored by human beings, and the estimated MoS may be determined by extrapolating from and/or interpolating between the MoSs associated with the different standard scenarios. For example, a panel of users may score the test source digital image presented on a first standard display, score the test source digital image presented on a second standard display, score the test derived digital image presented on the first standard display, and score the test derived digital image presented on the second standard display. The first standard display may be a state-of-the-art display; the second standard display may be a low-end display. The estimated MoS for other displays may be determined as a value between the MoS associated with the first standard display and the MoS associated with the second standard display.

In some cases, a plurality of derived digital images may be transcoded from the same source digital image, for example using different amounts of compression. For some source digital images, for example a digital image of a widely known sports event such as a winning goal in a World Cup Final, multiple derived digital images may be cached or stored in memory, and when a mobile device requests the associated digital image, one of the cached derived digital images may be selected and transmitted to the mobile device. In an embodiment, an estimated MoS for each of the cached derived digital images may be determined based on the display characteristics of the mobile device, and a cached derived digital image having an estimated MoS that meets the minimum MoS threshold is selected and sent to the mobile device.

It is contemplated that in some embodiments the transcoding may be adapted in real-time. Said in other words, the requested source digital image may be transcoded to create a first derived digital image, an estimated MoS for the first derived digital image is determined, if the estimated MoS for the first derived digital image does not meet the minimum MoS threshold, the transcoding algorithm parameter may be adapted, the source digital image may be transcoded again with the adapted transcoding algorithm to create a second derived digital image, an estimated MoS for the second derived digital image is determined, and if the estimated MoS for the second derived digital image meets the minimum MoS threshold, the second derived digital image is transmitted to the requesting mobile communication device. Otherwise, the transcoding algorithm parameter may be adapted again and another estimated MoS determined.

Turning now to FIG. 1A, a system 100 is described. In an embodiment, the system 100 comprises a mobile communication device 102 having a browser 104 and a display 106. The system 100 further comprises a content provider 110 comprising a plurality of source digital images 108, for example digital images associated with web content and which may be referred to in some contexts as web images. The browser 104 may execute on the mobile communication device 102 and request one or more source digital images 108 from the content provider 110. Communication between the device 102 and the content provider 110 may be provided by a wireless link between the device 102 and a base transceiver station (BTS) 112 and by wired links between the BTS 112, a network 114, and the content provider 110. When the browser 104 receives a source digital image 108 or an image derived from the source digital image 108 (for example, a compressed version of the source digital image 108), it may render the image in the display 106.

The mobile communication device 102 may be a mobile phone, a personal digital assistant (PDA), a media player, a wearable computer, a headset computer, a laptop computer, a tablet computer, or a notebook computer. The network 114 comprises one or more public networks, one or more private networks, or a combination thereof. The BTS 112 may be an enhanced Node B (eNB). The BTS 112 may be a cell tower. The BTS 112 may communicate with the mobile device 102 using a code division multiple access (CDMA), a global system for mobile communications (GSM), a long term evolution (LTE), a worldwide interoperability for microwave access (WiMAX) wireless communication protocol. In an embodiment, the mobile device 102 may be coupled to the network 114 by a wireless access point, for example a WiFi access point or a Bluetooth® access point. While the descriptions and examples herein focus on mobile communication devices, it is understood that the teachings of the present disclosure may be applied advantageously to stationary devices, for example desktop computers having a web browser accessing source digital images 108 via the content provider 110.

The content provider 110 is illustrated in FIG. 1A as a data store. In an embodiment, the content provider 110 may comprise a computer system executing web site software and coupled to one or more data stores comprising a variety of content including the source digital images 108 as well as other content such as video content and textual content. This may be referred to as a web site or a plurality of web sites. A user of a browser may click on a link that invokes a universal reference locator (URL) that refers to a hypertext markup language (HTML) document hosted by the content provider (e.g., stored in a data store, access to which is mediated by the web site software executed on the content provider computer system). The web site may retrieve the referenced HTML document and send this to the browser, for example via the network 114. The HTML document may include embedded references to web images (e.g., image tags in the HTML document), where web images are understood to be digital images. When the browser, for example the browser 104 of the mobile device 102, renders the HTML document, it sends a request for the web images identified in the embedded references, for example sends another request to the content provider 110 that includes a URL identifying the content provider 110 and the source digital image 108. It is understood that users of mobile devices 102 expect a timely return of content. If it takes more than 1 or 2 seconds for a web image to render and be presented on the display 106 after the textual content has displayed, the user may be dissatisfied. In an embodiment, the request for the source digital image 108 may comprise a user agent header that identifies the device sending the request, for example identifies the make and model of the mobile communication device 102.

The content provided by the content provider 110 may be of a generic format or of a format most suitable for desktop computer displays or laptop computer displays. It may be desirable to change the source digital image 108 to a derived digital image before sending it to the mobile device 102 for presentation on the display 106. This changing of the source digital image 108 may broadly be referred to as transcoding the source digital image 108 to a derived digital image. Transcoding may comprise one or more of changing the file format of the digital image, changing the aspect ratio of the digital image, changing the number of pixels of the digital image, changing the color depth of the digital image (e.g., changing the color depth of the pixels by changing the number of bits used to represent the color of the pixels), and/or compressing the digital image.

In an embodiment, content requests from the mobile communication device 102 referencing the content provider 110 may be brokered or mediated by a proxy web server, for example a media optimization server 116. The media optimization server 116 may comprise a transcoder application 118 that performs various kinds of transcoding on content transmitted to the mobile communication device 102 or other device that has requested the content. The transcoder application 118 may be configured with one or more parameters 120 that are used to adapt one or more transcoding algorithms. For example, one parameter 120 may be used by the transcoder application 118 to adapt an amount of compression performed on source digital images 108 to produce a derived digital image that is transmitted to the mobile device 102. For example, the parameter 120 may be varied in a range from a value of 1 to a value of 5, where one extreme of this range corresponds to minimum compression and the other extreme of this range corresponds to maximum compression. In an embodiment, one extreme of this range may correspond to no compression. It is understood that other value ranges may be associated with the parameter 120. When a request for a source digital image 108 is transmitted by the mobile communication device 102, the media optimization server 116 receives the source digital image 108 sent by the content provider 110, transcodes the source digital image 108 using the transcoder application 118, based on the values of one or more of the parameters 120, and sends the resultant derived digital image to the mobile communication device 102. The browser 104 renders the derived digital image on the display 106 of the mobile communication device 102.

The present disclosure teaches estimating the quality of the presentation of the derived digital image created by the transcoder application 118 on the display 106 and adapting one or more of the parameters 120 based on the estimated quality to achieve a desired digital image quality standard. In an embodiment, a transcoding adaptation server 122 comprises a mean opinion score (MoS) estimation application 124 and a parameter adaptation application 126. The MoS estimation application 124 determines an estimated MoS for derived digital images and compares them to a quality standard. The estimated MoS may be determined based on comparing various characteristics affecting the quality of the presentation of the derived digital image on the display 106 to various characteristics effecting MoS data 130 stored in a data store 128. The MoS data 130 is created by test users (e.g., human beings) evaluating the quality of images presented on one or more standard displays, as is discussed in more detail hereinafter. Estimating MoS and estimating the quality of the presentation of the derived digital image on the display 106 is discussed further hereinafter.

In an embodiment, the parameter adaptation application 126 changes one or more of the parameters 120 based on statistical analysis of a plurality of estimated MoS values determined on derived digital images sent to one or more mobile communication devices 102. For example, an average of estimated MoS values may be calculated periodically (e.g., at a periodic interval), and one or more parameters 120 may be changed, if needed, periodically in association with the calculation of the average of estimated MoS values. An average estimated MoS value may be calculated over a day. If the average estimated MoS value is below a pre-defined quality standard, one or more parameters 120 may be changed in a first sense to desirably improve the quality of image presentation experience of users of the mobile communication device 102. Alternatively, a different threshold for adapting one or more of the parameters 120 may be employed. For example, if less than about 80% of the estimated MoS values are above the pre-defined quality standard (e.g., if about 20% or more of the estimated MoS values are below the pre-defined quality standard), one or more of the parameters 120 may be adapted. It is contemplated that other adaptation thresholds may be employed.

If the average estimated MoS value is above the pre-defined quality standard (or if more than 80% of the estimated MoS values are above the pre-defined quality standard, or some other percentage), one or more parameters 120 may be changed in a second sense, contrary to the first sense, to desirably reduce network loads while still maintaining acceptable quality of image presentation experience of users. If the average estimated MoS value is substantially equal to the pre-defined quality standard, the parameters 120 may be left unchanged.

In an embodiment, estimated MoS values may not be calculated during every cycle of requesting a digital image, transcoding the digital image, and transmitting the digital image. In an embodiment, estimated MoS values are calculated for only 10 percent of the digital image request cycles. In another embodiment, estimated MoS values are calculated for only about 1 percent of the digital image request cycles. In another embodiment, estimated MoS values are calculated for some other fraction of the total number of digital image request cycles.

Alternatively, the statistical analysis may focus on the standard deviation of the MoS values, and the parameters 120 may be adapted based on the MoS value of the first standard deviation or of the second standard deviation relative to a minimum desired MoS value. Said in another way, the parameters 120 may be adapted to improve quality of delivered digital images if the first lower standard deviation MoS value is below the minimum desired MoS value. Assuming the MoS values are normally distributed for purposes of illustration, this would imply that the parameters 120 are adapted or set to assure that about 84% of users experience a digital image presentation experience at or above the minimum desired MoS value. It is understood that the threshold may be set for different numbers of standard deviation below the mean, for example 0.5 standard deviations below the mean or 1.2 standard deviations below the mean or some other value.

The statistics of estimated MoS values may be calculated and the parameters 120 changed with reference to different time periods, for example hourly, every 3 hours, daily, weekly, or another interval. Alternatively, the statistics of estimated MoS values may be calculated and the parameters 120 changed on a specific schedule, for example at a morning time that precedes the typical work day start time, at an evening time that precedes the typical after-dinner time, at a night time that precedes the typical daily bed-time.

In another embodiment, one or more of the parameters 120 may be changed in real-time. For example, if the estimated MoS associated with transcoding the source digital image 108 by the transcoder application 118 based on a first value of the parameter 120 to create a first derived digital image is below the pre-defined quality standard, the parameter 120 may be changed to a second value, the source digital image 108 may be transcoded again by the transcoder application 118, this time based on the second value of the parameter 120, to create a second derived digital image. If the estimated MoS for the second derived digital image achieves the pre-defined quality standard, the second derived digital image may be sent on to the mobile communication device 102 for rendering by the browser 104 and presentation on the display 106.

In an embodiment, if the estimated MoS for the second derived digital image surpasses the pre-defined quality standard, the second derived image may be sent on to the mobile device 102 and the parameter 120 may be changed in a sense associated with producing an estimated MoS that equals rather than exceeds the pre-defined quality standard, whereby future loading on network resources may be reduced. Thus, the parameter 120 may be changed or adapted to balance between the conflicting goals of maintaining a high quality of user experience and reducing network traffic loads to assure that all users have access to communication services with good quality.

In an embodiment, selected mobile communication devices 102 are associated with real-time adaptation of the parameters 120, for example devices 102 associated with premium subscription accounts, while non-selected devices 102 are associated with periodic adaptation of the parameters 120. After transcoding source digital images 108 for a device 102 associated with a premium subscription account, the parameters 120 may be restored to the values they had before real-time adaptation associated with a premium subscription account. In an embodiment, a different pre-defined quality standard may be defined for premium subscription accounts than for normal subscription accounts.

In an embodiment, the system 100 may comprise a plurality of media optimization servers 116 and/or a plurality of transcoder applications 118. Digital images associated with different makes and models of different mobile communication devices 102 may be transcoded by different media optimization servers 116 and/or different transcoder applications 118. In such an embodiment, the parameters 120 may be adapted specifically for a make and model of mobile communication device 102 or to a category of mobile communication device 102. In this case, the statistical analysis of estimated MoS scores may be performed on estimated MoS scores associated with a specific make and model of communication device 102 or with a category of mobile communication device 102. In an embodiment, a mix of this approach may be employed. For example, digital images requested by instances of an especially popular smart phone may be transcoded by a media optimization server 116 and/or transcoder application 118 that does not perform transcoding for digital images requested from other devices. At the same time in the same system, digital images requested by other smart phones may be transcoded by a separate media optimization server 116 and/or transcoder application 118.

Figure 1B:
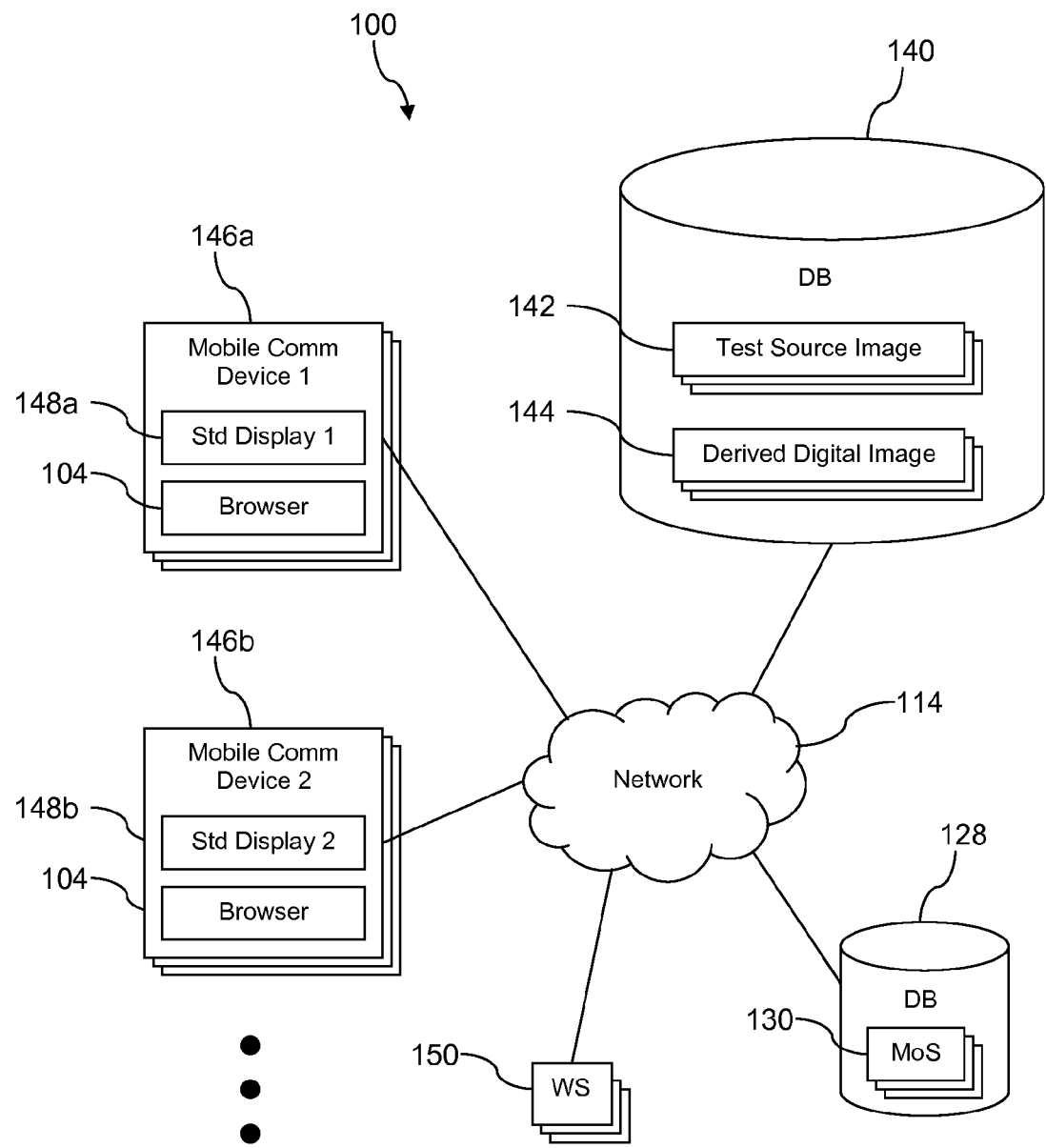

Turning now to FIG. 1B, further details of the system 100 are described. In an embodiment, the system 100 also comprises a plurality of mobile communication devices 146 that may be viewed as test mobile devices or standard mobile devices. A first mobile communication device 146a may comprise the browser 104 and a first standard display 148a. The display is said to be a "standard" display because it is used to present digital images that are scored by human beings to generate mean opinion scores. Alternatively the display could be referred to as a "control" display. For example, a plurality of scorers may be empaneled to score the quality of their experiences viewing digital images presented on the first standard display 148a. The scores from the plurality of scores may be processed to create a summary score representing the quality experience of the panel of scorers as a group, for example by calculating an average or a mean of the scores. This summary score may be referred to generically herein as a mean opinion score (MoS).

While the term "mean opinion score" and the abbreviation "MoS" is used throughout this disclosure, it is understood that the teachings of the present disclosure can be applied using another algorithm for summarizing the scores of the empaneled scorers that does not involve calculating a mathematical mean. For example, the MoS may be replaced herein by a weighted average, where some of the scorers are given more weight in determining the summary score than other scorers, for example to bias the summary score in accordance with a demographic distribution of users of mobile communication devices or to compensate for a non-representative pool of scorers. The summary score may be calculated as a mathematical average rather than as a mathematical mean.

A panel of scorers or test users may be selected to score the quality of experience of presentation of test source digital images 142 and test derived digital images 144 on the first standard display 148a of the first mobile communication device 146a. The test source digital images 142 and the test derived digital images 144 may be stored in a data store 140. The test source digital images 142 may be transcoded, for example using the same transcoder application 118 configured with parameters 120, to create the test derived digital images 144. Some test source digital images 142 may be associated with a plurality of different test derived digital images 144. For example, the same test source digital image 142 may be transcoded several times, each time using the transcoder application 118 configured with different values of parameters 120, to create several different test derived digital images 144 all associated with the same test source digital image 142.

The panel of scorers may be selected to include a mix of adolescents, adults, middle-aged adults, and seniors. The panel of scorers may be selected to include a mix of males and females. In some circumstances, the selection of the mix of scorers may be made to reflect a demographic of users of mobile communication devices 102 or to reflect a demographic of users of mobile communication devices 102 that use the device 102 frequently for looking at digital images on the display 106.

A scorer looks at a digital image presented on the standard display 148a, for example a test source digital image 142 or a test derived digital image 144, determines a score that best reflects the visual quality of his or her experience looking at the digital image, and uses a work station 150 to enter that score. The entered score may be stored with relevant information such as an identity of the digital image and an identity of a make and model of the mobile communication device 146a or an identity of the mobile communication device 146a.

The score may be constrained to a specific value range, such as 1 to 5, 0 to 5, 1 to 10, 0 to 10, 1 to 100, 0 to 100, or some other value range. The scorers may be cued with textual suggestions how to score their viewing experiences. For example, a mapping may be provided that provides a textual cue associated with integer values. 1 may be associated with a textual cue of "unrecognizable," 2 may be associated with a textual cue of "barely recognizable," 3 may be associated with a textual cue of "recognizable but blurred," 4 may be associated with a textual cue of "good," and 5 may be associated with a textual cue of "crystal clear and sharp." The scores may then be processed to create a summary score, for example a mean opinion score (MoS) or some other summarizing figure of merit. The summary score, for example the MoS 130, may be stored in the data store 128. The MoS 130 may comprise some contextual information about the score, for example the make and model of the mobile communication device 146a and the identity of the digital image. The MoS 130 may further comprise information about the test digital image 142, 144, for example size of the test digital image file, the aspect ratio of the test digital image, the number of pixels of the test digital image, the color depth of the test digital image (e.g., the number of bits used to represent the color of each pixel). For MoS 130 associated with test derived digital images 144, the contextual information may further comprise an identity of a transcoding application 118 and the values of parameters 120 configured in the application 118 that was used to create the test derived digital image 144, a size of the associated test source digital image 142, a number of pixels of the associated test source digital image 142, a color depth of the associated test source digital image 142.

The same digital images 142, 144 may be scored in like fashion using other makes and models of mobile communication devices 146 having different standard displays 148. For example, the digital images 142, 144 may be scored using a second mobile communication device 146b comprising the browser 104 and a second standard display 148b. Because the first and second standard displays 148a, 148b may have different display characteristics and/or capabilities, the associated scores for the same digital images 142, 144 may be different. It is understood that the digital images 142, 144 may be scored in like fashion for any number of other makes and models of mobile communication devices 146, as desired.

The test devices 146 may be selected to reflect technical extremes of commercially available devices. For example, the first mobile communication device 146a may be a state-of-the-art smart phone that has the most powerful processor and the highest quality display 148 available, and the second mobile communication device 146b may be the oldest, least capable flip-phone that has a technically outdated display, but yet supports a browser 104 and presentation of digital images on the second standard display 148b. The test devices 146 may be selected based on the number of units of the subject make and model of mobile communication devices 146 in the market. For example, the test devices 146 may be selected as the three most popular smart phones in the market.

Turning again to FIG. 1A, further details of determining an estimated MoS are now described. At an abstract level, the approach to estimating a MoS for a given digital image, for example a derived digital image, is based on extrapolating from one or more MoS 130 (e.g., subjective scores developed by empaneled testers using standard devices with standard displays) based on the characteristics of the display 106. For example, if the MoS for a top end display is 5 and the MoS for the bottom end display is 3 and the display 106 is a middle grade display, the MoS may be estimated to be 4, all other things being equal. If other things are not equal, compensations may be made. For example, if the number of pixels of the source digital image 108 are fewer than the number of pixels of the test source digital image 142, the MoS of the derived digital image may be estimated to be 3.5.

In an embodiment, the range of adaptability or the range of control provided by the parameters 120 of the transcoder application 118 may constrain the complexity of the algorithm for estimating the MoS. For example, if the transcoder application 118 only supports setting a single parameter 120 to an integer value of 1, 2, 3, or 4, there may be no benefit to estimating the MoS with very high fidelity, using a complicated, processor intensive algorithm. In combination with the present disclosure, one skilled in the art will be able to select a suitable MoS estimation approach from the approaches described herein.

A MoS for a derived source image may be estimated based on the number of pixels in the derived source image, based on the number of pixels in the source digital image, based on the number of pixels in a test derived digital image, based on the number of pixels in a test source digital image, based on a MoS 130 associated with the subject test digital images, based on the characteristics of the standard display 148 associated with the MoS 130, and based on the characteristics of the display 106. The subject test digital images 142, 144 may be selected from the data store 140 based on similarities between the test source digital image 142 and the source digital image 108 and between the test derived digital image 144 and the derived digital image (e.g., similar pixel count, similar file size, or other similar property). In an embodiment, the MoS for the derived source image may be estimated without considering the number of pixels of the source digital image 108 and without considering the number of pixels of the test source digital image 142.

A MoS for a derived source digital image may be estimated based on the size (e.g., the number of bytes of the digital image file) of the derived source image, based on the size of the source digital image, based on the size of a test derived digital image, based on the size of a test source digital image, based on a MoS 130 associated with the subject test digital images, based on the characteristics of the standard display 148 associated with the MoS 130, and based on the characteristics of the display 106. The subject test digital images 142, 144 may be selected from the data store 140 based on similarities between the test source digital image 142 and the source digital image 108 and between the test derived digital image 144 and the derived digital image (e.g., similar pixel count, similar file size, or other similar property). In an embodiment, the MoS for the derived source image may be estimated without considering the size of the source digital image 108 and without considering the size of the test source digital image 142.

A MoS for a derived source digital image may be estimated based on the color depth of the pixels of the derived source image, based on the color depth of the pixels of the source digital image, based on the color depth of the pixels of a test derived digital image, based on the color depth of the pixels of a test source digital image, based on a MoS 130 associated with the subject test digital images, based on the characteristics of the standard display 148 associated with the MoS 130, and based on the characteristics of the display 106. The subject test digital images 142, 144 may be selected from the data store 140 based on similarities between the test source digital image 142 and the source digital image 108 and between the test derived digital image 144 and the derived digital image (e.g., similar pixel count, similar file size, or other similar property). In an embodiment, the MoS for the derived source image may be estimated without considering the color depth of the pixels of the source digital image 108 and without considering the color depth of the pixels of the test source digital image 142.

In an embodiment, a MoS of a derived source digital image may be estimated using combinations of the above approaches, for example considering both file size and pixel count of the digital images, considering both file size and color depth of pixels of the digital images, considering both pixel count and color depth of the digital images, or considering each of file size, pixel count, color depth of the digital images.

In an embodiment, the above procedure can be performed for multiple sets of test source images 142, test derived images 144, and associated MoS 130 values. For example, the above procedure may be carried out based on a first test source digital image, a first test derived digital image, a MoS value associated with the first test source digital image and the first test derived digital image, and the characteristics of the first standard display 148a and then repeated based on a second test source digital image, a second test derived digital image, a second MoS value associated with the second test source digital image and the second test derived digital image, and the characteristics of the second standard display 148b. The first and second test digital images 142, 144 and associated MoS 130 values may be selected based on the properties of the first standard display 148a and the second standard display 148b. For example, the standard displays 148 may be selected from a plurality of standard displays in order to bracket the characteristics of the display 106. If the test source digital images 142 are similar to the source digital image 108, the test derived digital images 144 are similar to the derived digital image, the estimated MoS may reasonably be determined as intermediate between the two associated MoS 130 values.

In some cases, the display 106 may be identical to one of the standard displays 148. In this case, if the source and derived digital images are similar to the test source digital image 142 and the test derived digital image 144, the estimated MoS value may be determined to be the MoS 130 value stored in the data store 110, without any extrapolation being employed. This may be considered to be a look-up. In general, however, it may not be practicable to have a complete set of MoS 130 values for every deployed display 106 and for every digital image file category that may be encountered. It should be remembered that the state-of-the-art of display technology advances quickly and that new models of mobile communication devices 102 are launched into the commercial marketplace frequently.

Figure 2:
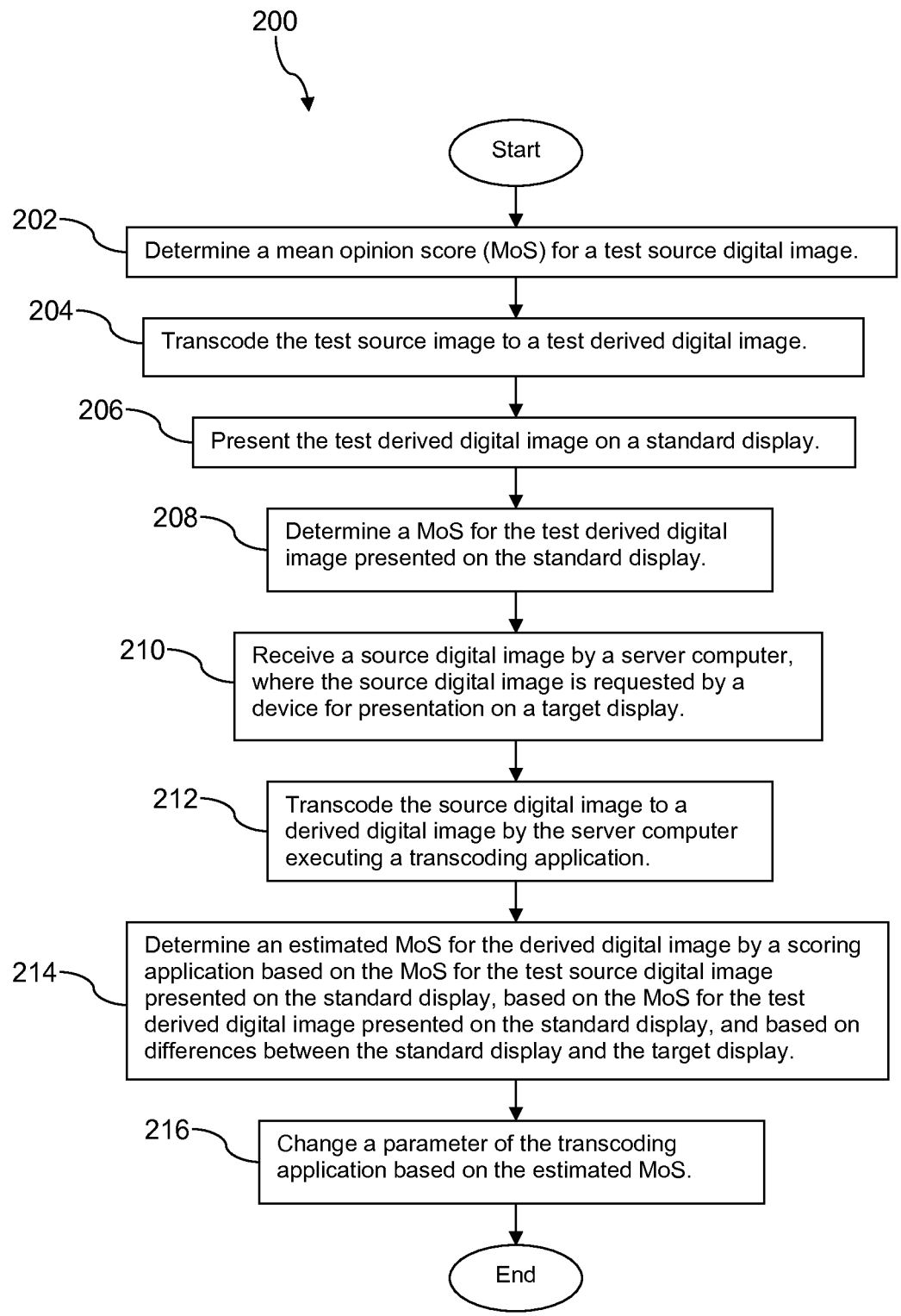
FIG. 2 is a flow chart of a method according to an embodiment of the disclosure.

Turning now to FIG. 2, a method 200 is described. At block 202, determine a mean opinion score (MoS) for a test source digital image. This may involve presenting the test source digital image on a standard display, viewing by a plurality of human beings the presentation of the test source digital image on the standard display (it is understood the several viewers may look at the image presented on different instances of the same standard make and model of display), scoring the quality of their viewing experience by each of the viewers, and processing the plurality of scores to determine the MoS. Determining MoS scores is discussed in more detail above. At block 204, transcode the test source digital image to a test derived digital image. Transcoding may comprise one or more of changing image file format by translating a digital image encoded in a first digital image format to a digital image encoded in a different second digital image format, compressing the digital image, changing the aspect ratio of the digital image, reducing the number of bits used to represent color for each pixel, or some other transcoding operation. At block 206, present the test derived digital image on a standard display. At block 208, determine a MoS for the test derived digital image presented on the standard display. The processing of blocks 202 through block 208 may be performed a number of times for different test source digital images and test derived digital images to develop a base of MoS data. This processing may be completed periodically, for example monthly, quarterly, or yearly.

At block 210, receive a source digital image by a server computer, where the source digital image is requested by a device for presentation on a display coupled to the device. For example, a mobile phone has requested a web image or a desktop computer has requested a web image. The web image is received by the server computer, for example a web proxy server. At block 212, the source digital image is transcoded to create a derived digital image by the server computer by executing a transcoding application. As above, transcoding may comprise one or more of changing a format of the digital image file, compression of the digital image file, changing the aspect ratio of the digital image, reducing the color depth of the pixels of the digital image, and other transcoding operations.

At block 214, determine an estimated MoS for the derived digital image by a scoring application based on the MoS for the test source digital image presented on the standard display, based on the MoS for the test derived digital image presented on the standard display, and based on differences between the standard display and the target display (e.g., the display associated with the device that requested the digital image, for example the display 106 of the mobile communication device 102 or the monitor of a desktop computer). It is contemplated that any of the alternative approaches to estimating a MoS described above may be employed to perform this step of processing.

At block 216, change a parameter of the transcoding application based on the estimated MoS. For example, if the estimated MoS is below a predefined threshold, change the parameter to moderate or reduce the amount of compression applied to the source digital image by the transcoding application. In an embodiment, this step of processing may comprise statistically processing a plurality of estimated MoS values and changing the parameter of the transcoding application based on the statistical processing results, as described further above with reference to FIG. 1A. For example, if an average estimated MoS determined over a day of operation is below a predefined threshold, the parameter is changed to moderate or reduce the amount of compression applied to the source digital image by the transcoding application.

In an embodiment, the processing of method 200 may be performed independently by each of a plurality of different instances of the transcoder application 118 executing on one or more instances of the media optimization server 116. In an embodiment, transcoding of source digital images 108 may be allocated among the different instances of transcoder applications 118 based on a category of the requesting mobile communication device 102. In this embodiment, the parameters 120 may be better adapted to the specific display characteristics of the device category and hence may support better or more accurate adaptation of the transcoder application 118. The different instances of transcoder applications 118 may be allocated to devices 102 categorized as high capability device, average capability device, and low capability device. Alternatively, the devices 102 may be categorized in a different way. In embodiment, the categories may be determined based on popularity of devices and/or revenue associated with devices. This would permit tuning transcoding to specific highly popular devices and/or tuning transcoding to specific highly profitable devices (e.g., device make and models associated with high revenue per unit, perhaps high end models favored by affluent subscribers).

Figure 3A:
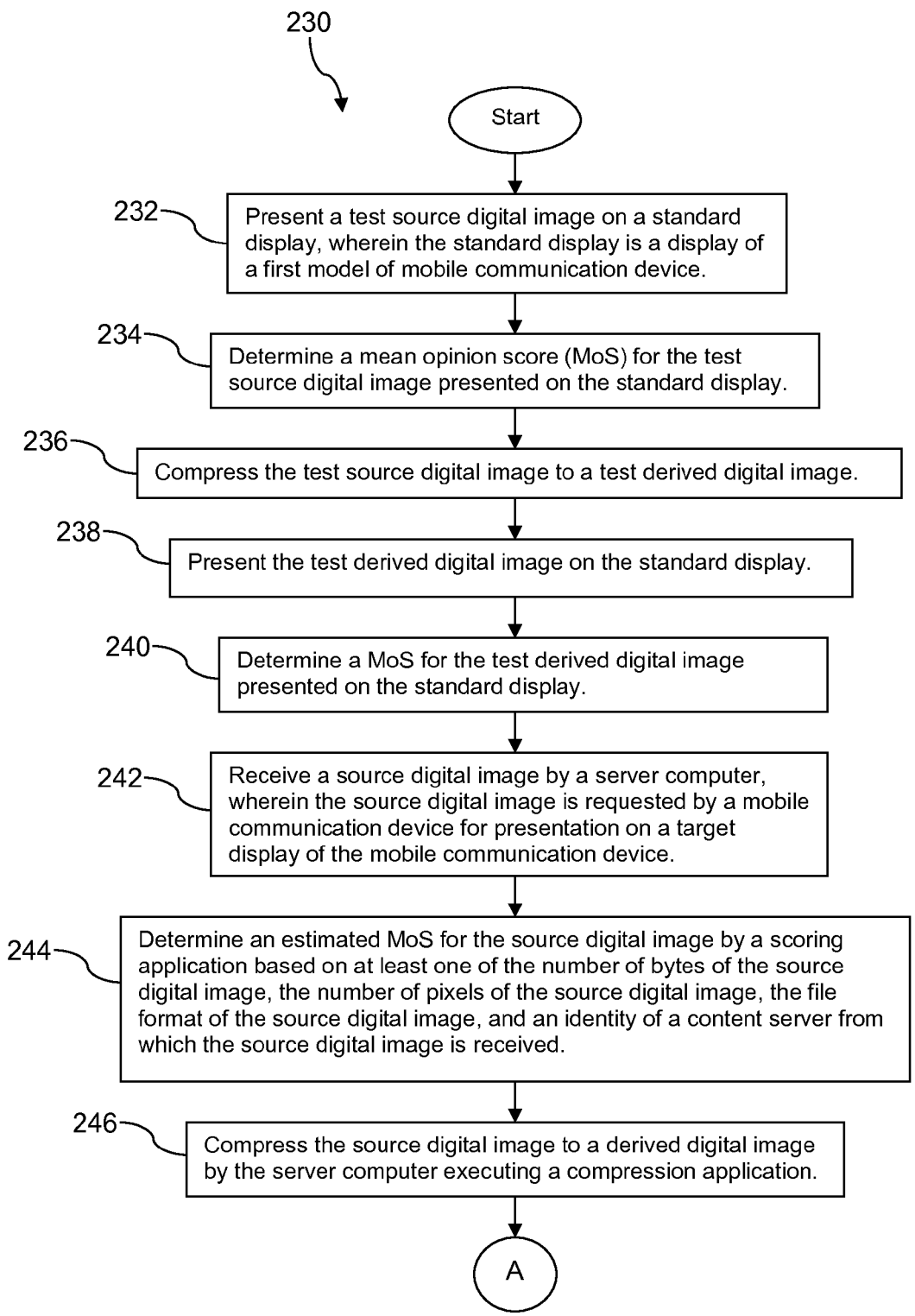
FIG. 3A and FIG. 3B is a flow chart of another method according to an embodiment of the disclosure.
Figure 3B:
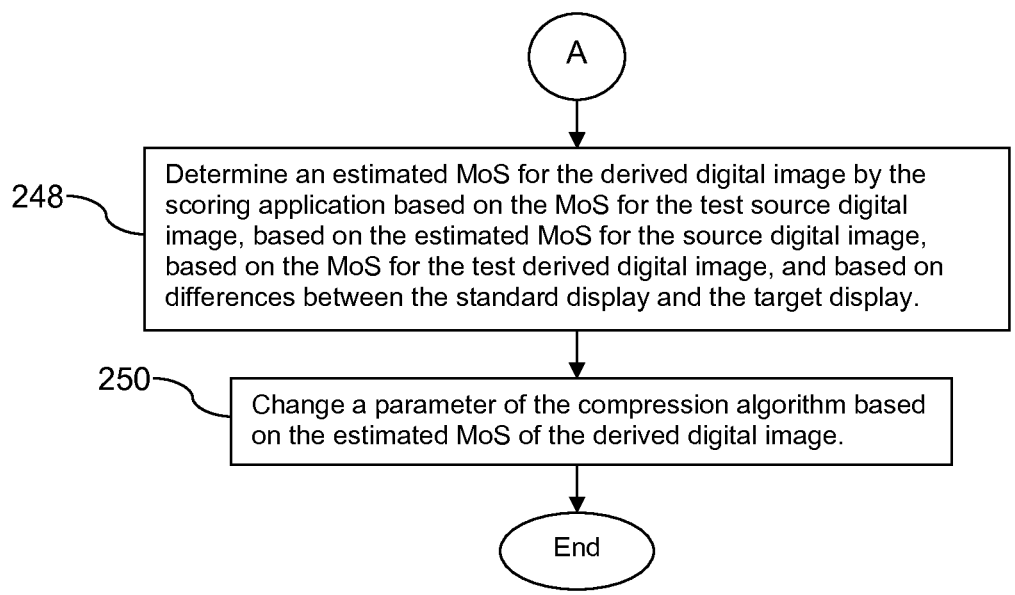

Turning now to FIG. 3A and FIG. 3B, a method 230 is described. At block 232, present a test source digital image on a standard display, wherein the standard display is a display of a first model of mobile communication device. At block 234, determine a MoS for the test source digital image presented on the standard display. The MoS value may be determined as described in more detail above. At block 236, compress the test source digital image to a test derived digital image.

Compression of digital image files typically results in a file that is smaller (e.g., has a fewer number of bytes). In a preferred embodiment, a lossy compression algorithm is employed. As used herein, the term lossy compression algorithm refers to a loss of source digital image data that cannot be recovered. For example, if pixels having color encoded with 24 bits are truncated to the 20 most significant bits, the resultant digital image file is compressed—is reduced in size—but the truncated 4 least significant bits of color data cannot be recovered and hence information is lost. It is generally thought that in many cases some color bits can be discarded without causing significant or even observable degradation of the compressed digital image when observed by a human being. Lossy compression may rely upon other strategies for reducing information and hence size of the digital image file, for example by reducing image resolution by discarding and combining proximate pixels, for example transducing a 1024×1024 pixel digital image to a 512×512 pixel digital image.

At block 238, present the test derived digital image on the standard display. At block 240, determine a MoS for the test derived digital image presented on the standard display. At block 242, receive a source digital image by a server computer, wherein the source digital image is requested by a mobile communication device for presentation on a target display of the mobile communication device. At block 244, determine an estimated MoS for the source digital image by a scoring application based on at least one of the number of bytes of the source digital image, the number of pixels of the source digital image, the file format of the source digital image, and an identity of a content server from which the source digital image is received.

It may be the case, for example, that a first content server or content provider is known to provide source digital images that are lower in resolution (e.g., fewer pixels, fewer bits for color representation per pixel, or both) than corresponding source digital images provided by a second content server or content provider. Alternatively, the first content provider may provide source digital images in a file format that is desirably transcoded to a preferred file format while the second content provider may provide source digital images in the preferred file format (the assumption may be that transcoding from a first file format to a second file format may be a lossy process or a process that reduces the quality of the digital image in some way). The transcoding adaptation server 122 may perform the MoS estimation by executing the MoS estimation application 124. In an embodiment, the role of the content provider may be taken into account not when estimating the MoS of the source digital image but instead when estimating the MoS of the derived digital image in block 248 below.

At block 246, compress the source digital image to a derived digital image by the server computer executing a compression algorithm. For example, the media optimization server 116 executes the transcoder application 118 based on the parameters 120 to compress the source digital image. At block 248, determine an estimated MoS for the derived digital image by the scoring application based on the MoS for the test source digital image, based on the estimated MoS for the source digital image, based on the MoS for the test derived digital image, and based on differences between the standard display and the target display. For example, the MoS estimation application 124 executing on the transcoding adaptation server 122 determines the estimated MoS for the derive digital image. At block 250, a parameter of the compression algorithm is changed based on the estimated MoS for the derived digital image. For example, the parameter adaptation application 126 executing on the transcoding adaptation server 122 accesses and changes one or more parameters 120 of the transcoder application 118 executing on the media optimization server 116. In this way, the transcoding of digital images may be adapted based on estimated mean opinion scores of digital images.

Figure 4A:
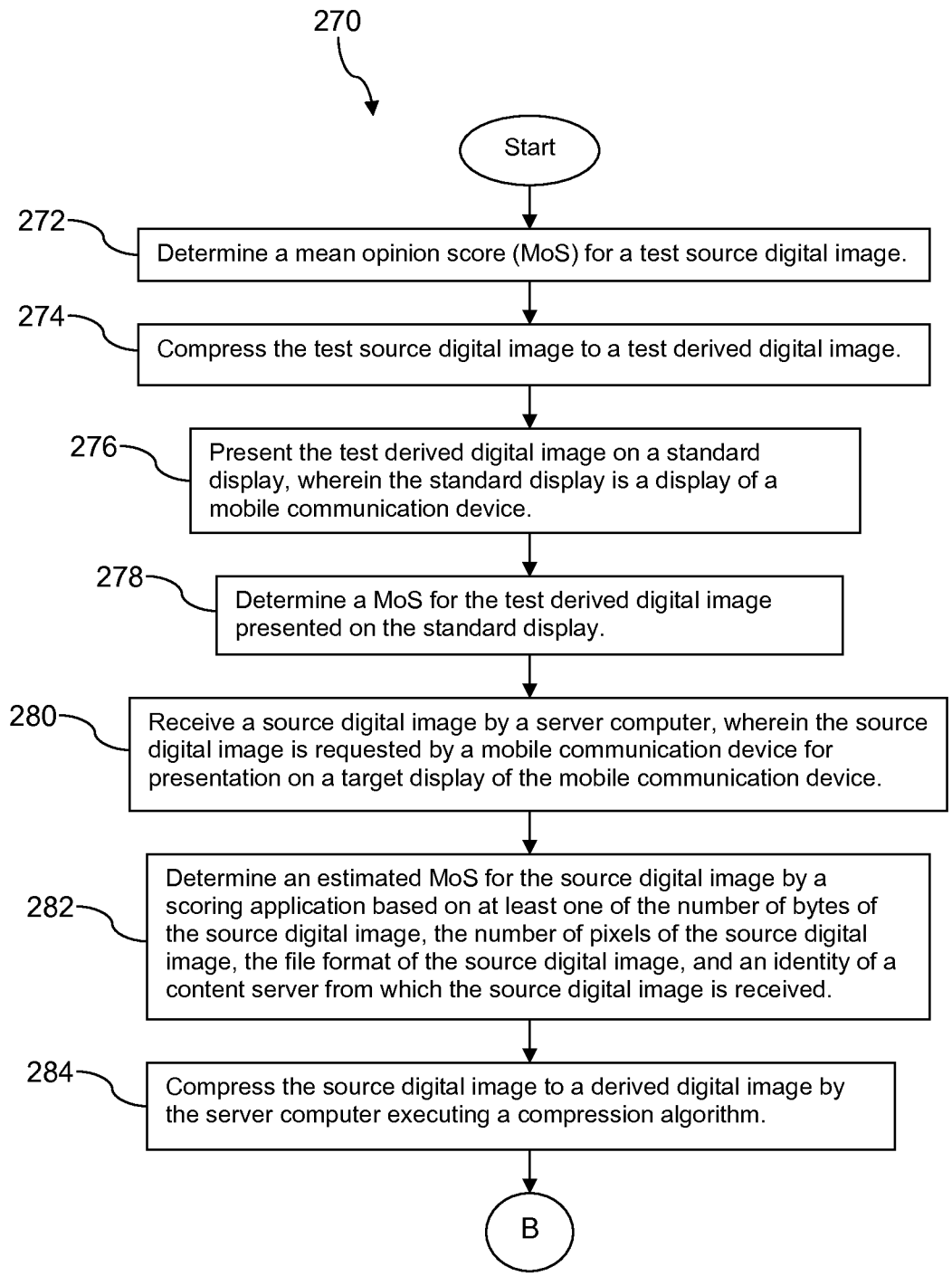
FIG. 4A and FIG. 4B is a flow chart of a different method according to an embodiment of the disclosure.
Figure 4B:
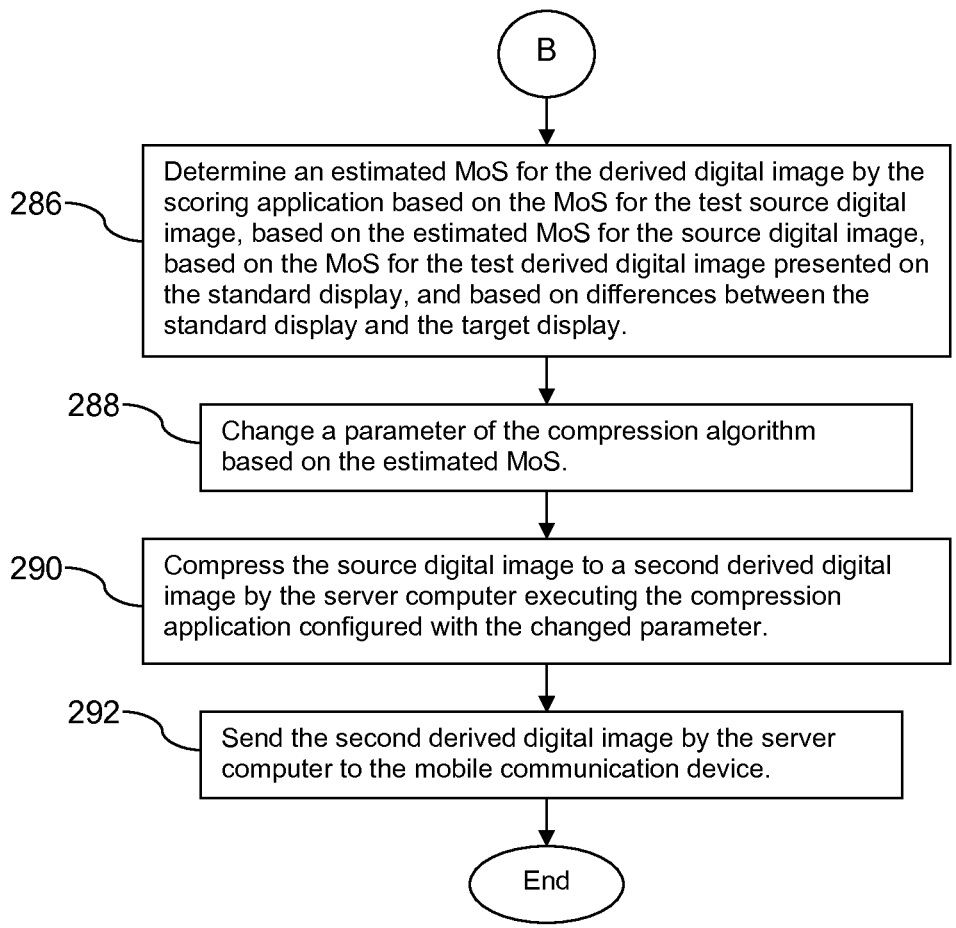

Turning now to FIG. 4A and FIG. 4B, a method 270 is described. At block 272, determine a mean opinion score for a test source digital image. At block 274, compress the source digital image to a test derived digital image. At block 276, present the test derived digital image on a standard display, wherein the standard display is a display of a mobile communication device. At block 278, determine a MoS for the test derived digital image presented on the standard display. At block 280, receive a source digital image by a server computer, wherein the source digital image is requested by a mobile communication device for presentation on a target display of the mobile communication device. At block 282, determine an estimated MoS for the source digital image by a scoring application based on at least one of the number of bytes of the source digital image, the number of pixels of the source digital image, the file format of the source digital image, and an identity of a content server from which the source digital image is received. At block 284, compress the source digital image to a derived digital image by the server computer executing a compression algorithm.

At block 286, determine an estimated MoS for the derived digital image by the scoring application based on the MoS for the test source digital image, based on the estimated MoS for the source digital image, based on the MoS for the test derived digital image presented on the standard display, and based on differences between the standard display and the target display. At block 288, change a parameter of the compression algorithm based on the estimated MoS. At block 290, compress the source digital image to a second derived digital image by the server computer executing the compression application configured with the changed parameter. At block 292, send the second derived digital image by the server computer to the mobile communication device.

Figure 5:
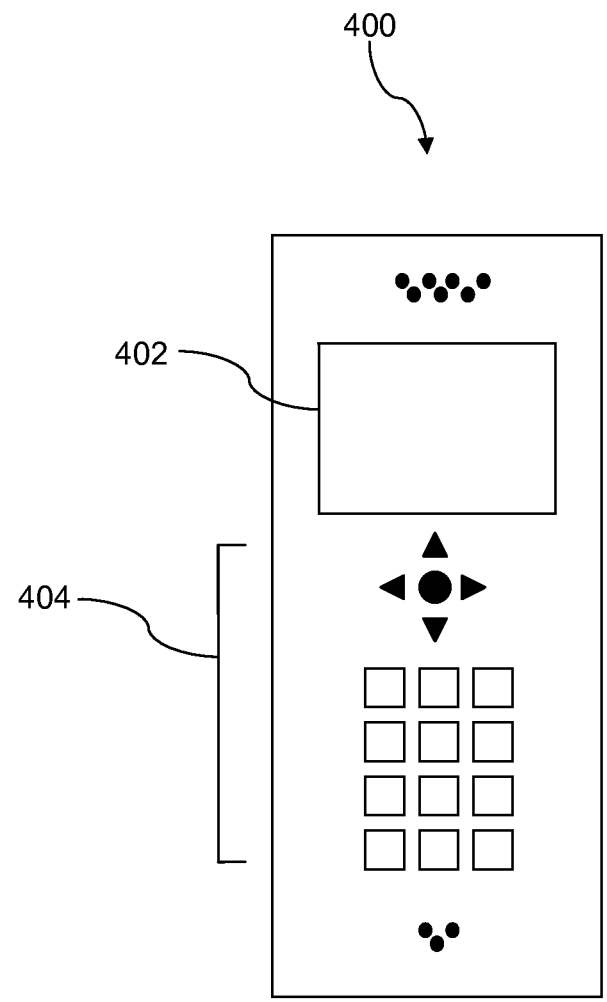
FIG. 5 is an illustration of a handset according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
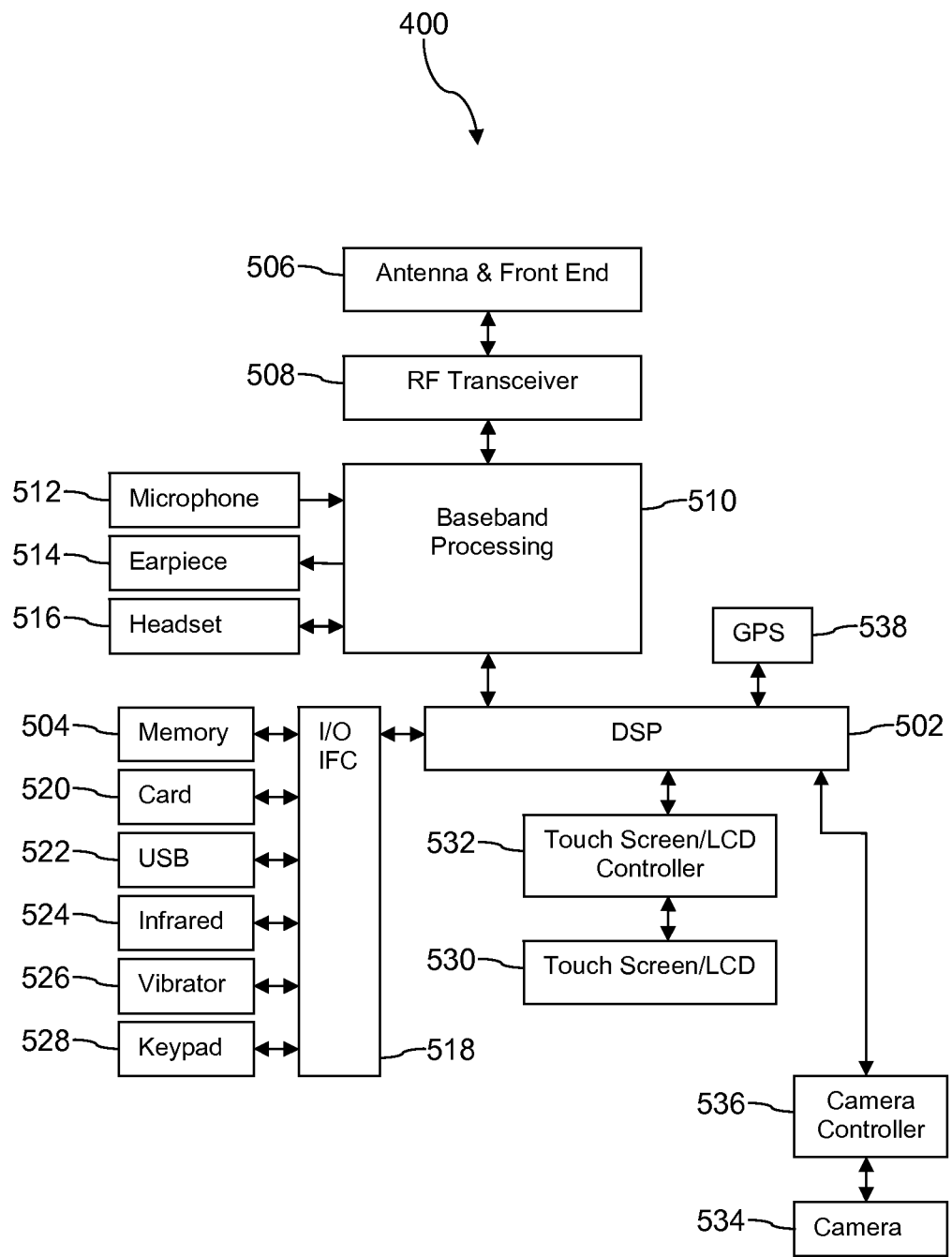
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
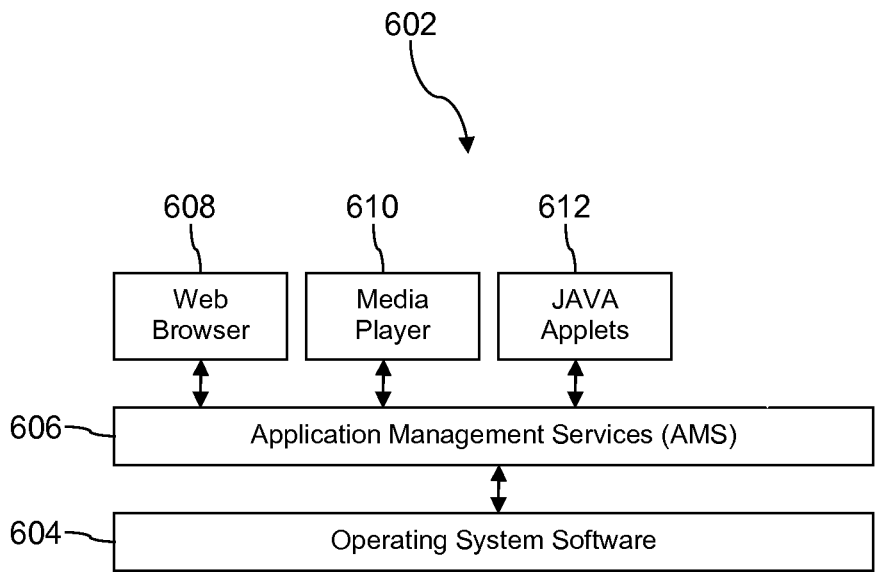
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
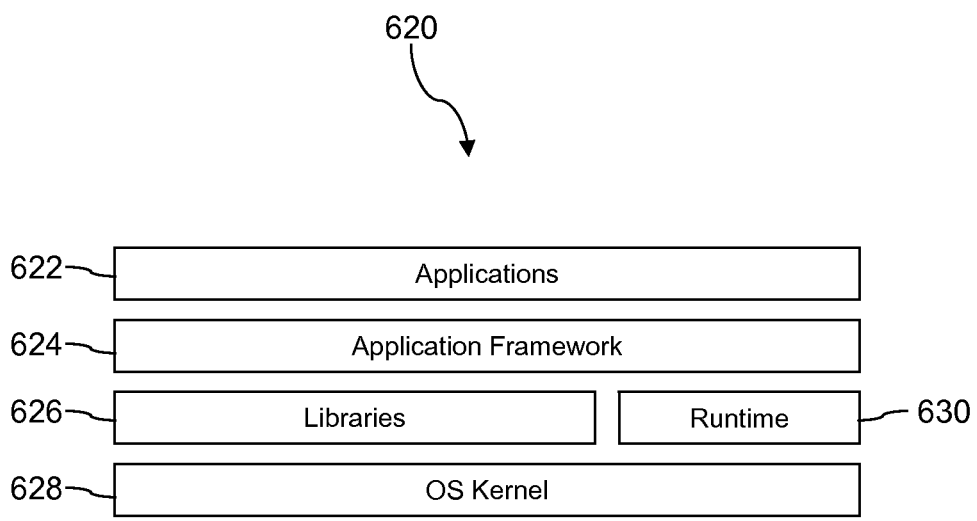
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
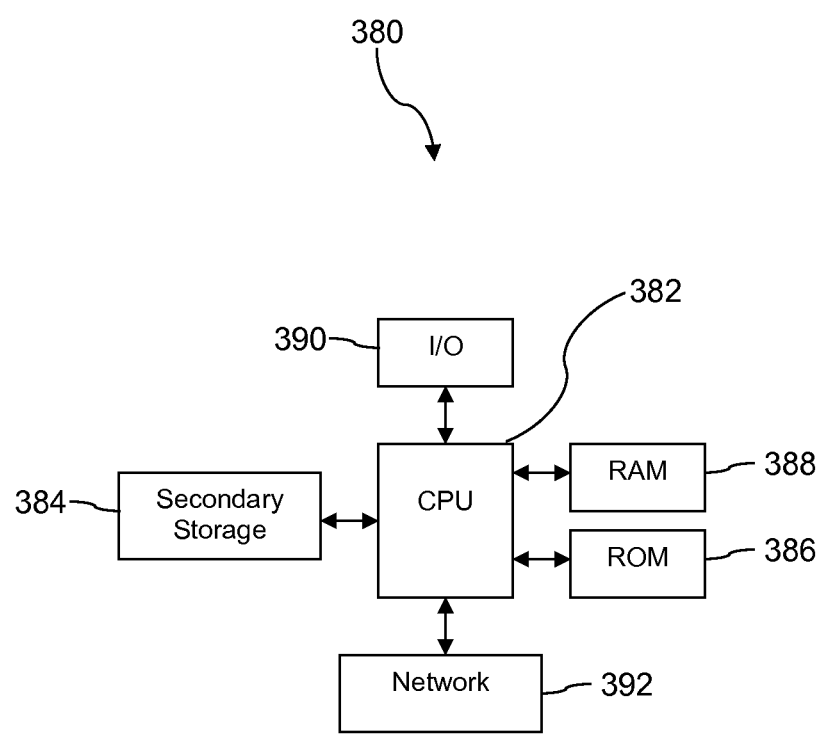
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/ or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of transcoding web images, comprising:
   determining a mean opinion score for a test source digital image;
   transcoding the test source digital image to a test derived digital image;
   presenting the test derived digital image on a standard display;
   determining a mean opinion score for the test derived digital image presented on the standard display;
   receiving a source digital image by a server computer, where the source digital image is requested by a device for presentation on a target display;
   transcoding the source digital image to a derived digital image by the server computer executing a transcoding application;
   determining an estimated mean opinion score for the derived digital image by a scoring application based on the mean opinion score for the test source digital image, based on the mean opinion score for the test derived digital image presented on the standard display, and based on differences between the standard display and the target display; and
   changing a parameter of the transcoding application based on the estimated mean opinion score.

2. The method of claim 1, wherein the mean opinion score for the test source digital image and the mean opinion score for the test derived digital image are determined by a plurality of human beings selected to have a range of ages from adolescence to senior citizen.

3. The method of claim 1, wherein transcoding the test source digital image to the test derived digital image comprises compressing the test source digital image using the transcoding application configured with a first value of the parameter, wherein transcoding the source digital image to the derived digital image comprises compressing the source digital image using the transcoding application configured with the first value of the parameter, and wherein changing the parameter of the transcoding application changes the value of the parameter to a second value that is different from the first value.

4. The method of claim 1, further comprising determining an estimated mean opinion score of the source digital image by the scoring application based on the mean opinion score for the test source digital image, based on a format of the test source digital image, and based on a format of the source digital image, wherein the parameter of the transcoding application is changed further based on the estimated mean opinion score of the source digital image.

5. The method of claim 1, wherein the differences between the standard display and the target display comprise one or more of difference of display size, difference of numbers of pixels, or difference of display contrast.

6. The method of claim 1, wherein the estimated mean opinion score of the derived digital image is determined further based on the number of bytes of the derived digital image.

7. The method of claim 6, wherein the estimated mean opinion score of the derived digital image is determined further based on the number of bytes of the source digital image.

8. The method of claim 7, wherein the estimated mean opinion score of the derived digital image is determined further based on the number of bytes of the test source digital image and the number of bytes of the test derived digital image.

9. The method of claim 1, wherein the estimated mean opinion score for the derived digital image is further determined by the scoring application by interpolating among a plurality of mean opinion scores determined by human beings for the test derived digital image presented on a plurality of different standard displays based on differences between the different standard displays and the target display.

10. A method of compressing web images, comprising:
    presenting a test source digital image on a standard display, wherein the standard display is a display of a first model of mobile communication device;
    determining a mean opinion score for the test source digital image presented on the standard display;
    compressing the test source digital image to a test derived digital image;
    presenting the test derived digital image on the standard display;
    determining a mean opinion score for the test derived digital image presented on the standard display;
    receiving a source digital image by a server computer, wherein the source digital image is requested by a mobile communication device for presentation on a target display of the mobile communication device;
    determining an estimated mean opinion score for the source digital image by a scoring application based on at least one of the number of bytes of the source digital image, the number of pixels of the source digital image, the file format of the source digital image, and an identity of a content server from which the source digital image is received;
    compressing the source digital image to a derived digital image by the server computer executing a compression application;
    determining an estimated mean opinion score for the derived digital image by the scoring application based on the mean opinion score for the test source digital image, based on the estimated mean opinion score for the source digital image, based on the mean opinion score for the test derived digital image, and based on differences between the standard display and the target display; and
    changing a parameter of the compression application based on the estimated mean opinion score for the derived digital image.

11. The method of claim 10, further comprising determining characteristics of the target display based on the model of the mobile communication device by the scoring application, wherein the model of the mobile communication device is identified in a request for the source digital image, wherein the differences between the standard display and the target display are determined in part based on the characteristics of the target display.

12. The method of claim 10, wherein the mobile communication device is one of a mobile phone, a personal digital assistant, and a media player.

13. The method of claim 10, wherein the mean opinion score for the test source digital image and the mean opinion score for the test derived digital image are determined based on a plurality of human beings visually evaluating and scoring the test source digital image presented on the standard display and the test derived digital image presented on the standard display.

14. The method of claim 10, further comprising
presenting the test source digital image on a second standard display, wherein the second standard display is a display of a second model of mobile communication device, and wherein the characteristics of the target display are between the characteristics of the standard display and the second standard display;
determining a second mean opinion score for the test source digital image presented on the second standard display;
presenting the test derived digital image on the second standard display; and
determining a second mean opinion score for the test derived digital image presented on the second standard display;
wherein the estimated mean opinion score for the source digital image is determined further based on the mean opinion score for the test source digital image and based on the second mean opinion score for the test source digital image, and
wherein the estimated mean opinion score for the derived digital image is determined further based on the second mean opinion score for the test derived digital image and based on differences between the second standard display and the target display.

15. The method of claim 14, wherein the estimated mean opinion score for the derived digital image is determined further based on at least one of the number of bytes of the test source digital image, the number of pixels of the test source digital image, and the file format of the test source digital image.

16. The method of claim 15, wherein the estimated mean opinion score for the derived digital image is determined in part as an interpolation between the mean opinion score for the test derived digital image and the second mean opinion score for the test derived digital image.

17. The method of claim 10, wherein the parameter of the compression application is a value in the range of 1 to 5.

18. A method of compressing web images, comprising:
determining a mean opinion score for a test source digital image;
compressing the test source digital image to a test derived digital image;
presenting the test derived digital image on a standard display, wherein the standard display is a display of a mobile communication device;
determining a mean opinion score for the test derived digital image presented on the standard display;
receiving a source digital image by a server computer, wherein the source digital image is requested by a requesting mobile communication device for presentation on a target display of the requesting mobile communication device;
determining an estimated mean opinion score for the source digital image by a scoring application based on at least one of the number of bytes of the source digital image, the number of pixels of the source digital image, the file format of the source digital image, and an identity of a content server from which the source digital image is received;
compressing the source digital image to a derived digital image by the server computer executing a compression application;
determining an estimated mean opinion score for the derived digital image by the scoring application based on the mean opinion score for the test source digital image, based on the estimated mean opinion score for the source digital image, based on the mean opinion score for the test derived digital image presented on the standard display, and based on differences between the standard display and the target display;
changing a parameter of the compression application based on the estimated mean opinion score;
compressing the source digital image to a second derived digital image by the server computer executing the compression application configured with the changed parameter; and
sending the second derived digital image by the server computer to the requesting mobile communication device.

19. The method of claim 18, wherein the requesting mobile communication device is one of a mobile phone, a personal digital assistant, a media player, and a wearable computer.

20. The method of claim 18, wherein the estimated mean opinion score for the derived digital image is further determined by the scoring application by interpolating among a plurality of mean opinion scores determined by human beings for the test derived digital image presented on a plurality of different standard displays based on differences between the different standard displays and the target display.

* * * * *